(12) United States Patent
Daly et al.

(10) Patent No.: US 7,691,249 B2
(45) Date of Patent: Apr. 6, 2010

(54) METHOD AND APPARATUS FOR MAKING ELECTROLYZED WATER

(75) Inventors: James Daly, Chester (GB); Michel van Schaik, Estonia (NL)

(73) Assignee: Clenox, LLC, Palm Beach Gardens, FL (US)

( * ) Notice: Subject to any disclaimer, the term of this patent is extended or adjusted under 35 U.S.C. 154(b) by 1208 days.

(21) Appl. No.: 11/004,252

(22) Filed: Dec. 3, 2004

(65) Prior Publication Data

US 2005/0183949 A1 Aug. 25, 2005

(30) Foreign Application Priority Data

Dec. 4, 2003 (GB) .................... 0328124.3

(51) Int. Cl.
*C02F 1/00* (2006.01)
(52) U.S. Cl. .............. 205/618; 205/100; 205/742; 205/788
(58) Field of Classification Search .......... 205/618, 205/100, 742, 788
See application file for complete search history.

(56) References Cited

U.S. PATENT DOCUMENTS

| 4,900,408 A | * | 2/1990 | Powers ............ 205/521 |
| 4,964,970 A |  | 10/1990 | O'Hare |
| 5,427,667 A |  | 6/1995 | Bakhir et al. |
| 5,871,623 A | * | 2/1999 | Bakhir et al. ............ 204/260 |
| 2005/0072675 A1 | * | 4/2005 | Dudziak et al. ............ 204/518 |

FOREIGN PATENT DOCUMENTS

| EP | 0 922 788 A1 | 6/1999 |
| GB | 2 107 353 A | 4/1983 |
| WO | WO 98/58880 A | 12/1998 |

* cited by examiner

*Primary Examiner*—Harry Wilkins
*Assistant Examiner*—Zulmariam Mendez
(74) *Attorney, Agent, or Firm*—Saliwanchik, Lloyd & Saliwanchik, P.A.

(57) ABSTRACT

An insulating end cap for a cylindrical electrolysis cell the type comprising at least two tubular electrodes with a cylindrical membrane arranged co-axially between them, comprises a first annular section with first and second axial ends, having at its first axial end a circular seating or one end of an outer cylindrical electrode and at its second end a circular aperture, of smaller diameter than the circular seating and co-axial therewith, to accommodate one end of the membrane. A second annular section of the end cap is detachably secured to the first and has a central circular aperture of smaller diameter than the central aperture of the first section and co-axial therewith, to accommodate one end of the inner cylindrical electrode. The two part construction of the end cap facilitates the assembly of the cell, and reduces the likelihood of breakage of the fragile ceramic membrane.

18 Claims, 4 Drawing Sheets

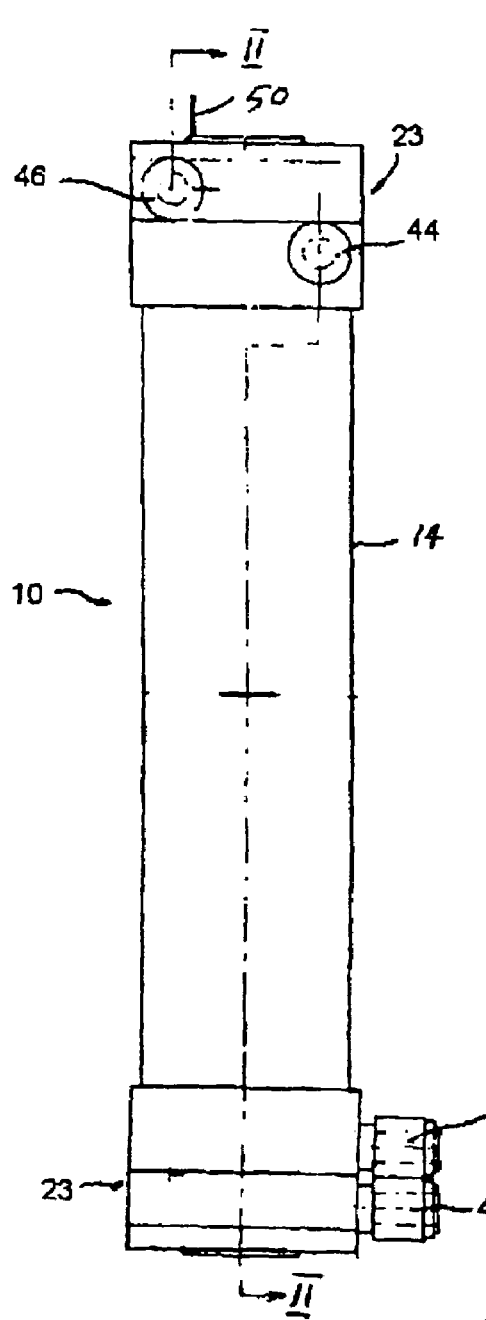
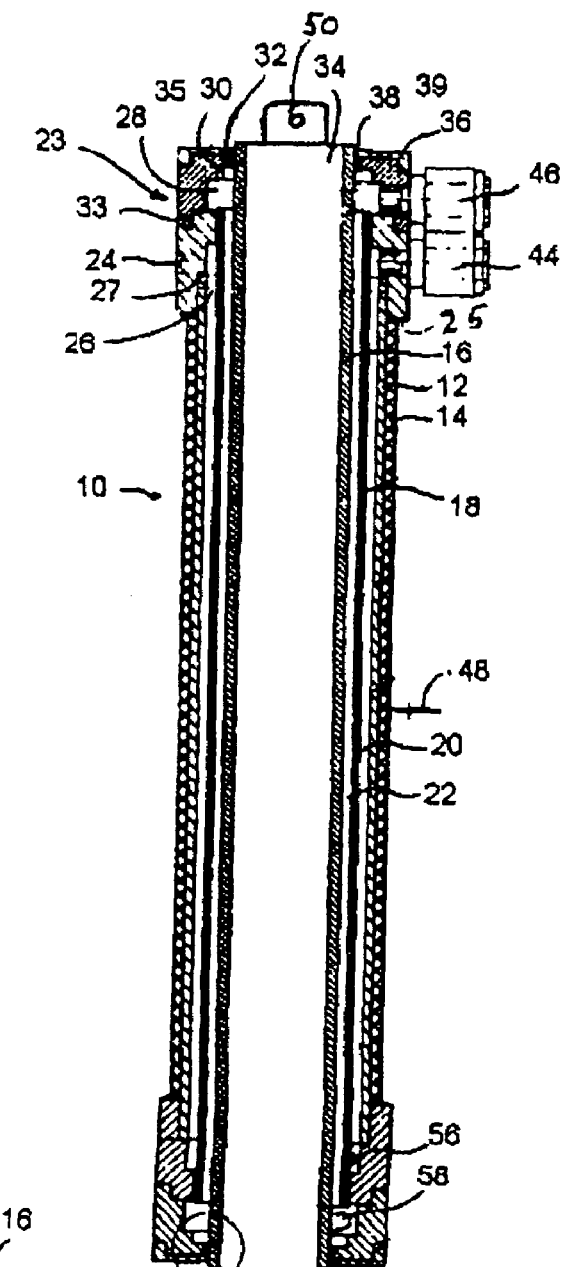
FIG. 1
FIG. 2
FIG. 2a

METHOD AND APPARATUS FOR MAKING ELECTROLYZED WATER

BACKGROUND OF THE INVENTION

1. Field of the Invention

This invention relates to an insulating end cap construction for a cylindrical electrolysis cell of the type comprising at least two tubular electrodes arranged coaxially, one within the other, with a cylindrical membrane arranged coaxially between them.

2. Description of the Prior Art

Cells of the type to which the invention relates can be used for example for sanitising water through electrolysis for drinking purposes, or electrolysing brine solutions to make a powerful biocide. Many types of electrochemical activation and electrolysis cells exist for this purpose, and generally comprise two concentric cylindrical electrodes, one of which acts as a cathode and the other as an anode, an ion-permeable membrane being located coaxially between them to separate the space between the electrodes into anode and cathode compartments. An electrolyte such as brine is passed through the anode and cathode compartments, separately or successively. When brine is electrolysed in this way, under suitable conditions, it can produce a sporicide solution of high strength and long shelf life, which is ecologically and human friendly.

One type of concentric cylindrical cell of the type to which the invention relates is disclosed in published European Patent Application No. 922788. This discloses an electrolytic cell in which the two concentric electrodes and the membrane are received in unitary end bushes, each having a central aperture for passage of the inner electrode with surrounding concentric seatings for the membrane and the outer electrode. Cells of this type function quite well, but a problem arises in their construction. A high degree of craft skill is required to assemble them, and in particular to assemble the cell components in the end bushes, and there is a high breakage rate. With brittle ceramic cylindrical membranes, damage rates can be as high as 1 in 5.

It is accordingly an object of the present invention to provide an end cap for an electrolytic cell which is easy to fit and reduces the likelihood of breakages.

It is another object of the present invention to provide a cylindrical cell which is leak-free and pressure-resistant. Many existing cells start leaking over a period of time as component parts are mechanically sealed with gaskets. During the lifetime of a cell, component parts become brittle, shrink or expand, causing leakages.

SUMMARY OF THE INVENTION

The present invention provides an insulating end cap for a cylindrical electrolysis cell of the type comprising at least two tubular electrodes arranged coaxially one within the other with a cylindrical membrane arranged coaxially between them, said end cap comprising:

a first annular section of insulating material with first and second axial ends, having at its first axial end a circular seating for one end of an outer cylindrical electrode and at its second end a circular aperture, of smaller diameter than said circular seating and coaxial therewith, to accommodate one end of a cylindrical membrane; and a second annular section of insulating material detachably secured to the first and having a central circular aperture, of smaller diameter than the central aperture of the first section and coaxial therewith to accommodate one end of an inner cylindrical electrode.

With the insulating end caps of the invention, the assembly of the cell can be greatly simplified, avoiding damage to components and allowing easier visual inspection at all stages of construction. Craft skills are not necessary, and sealants can more easily be used, avoiding the need for mechanical gasket or O-ring seals. The use of such non-toxic sealants helps to avoid leakages and imparts increased pressure resistance.

The sealants and the end caps can be made of a plastics material that is approved for medical purposes, and can be in contact with drinking water. The preferred sealants are two-part epoxy sealants which possess a high chemical resistance as well as a high degree of flexibility, so that seals are maintained even when components shrink or expand during the electrolysis process.

The second annular section is preferably secured to the first by means of a screw thread. This means that the end cap can be assembled and secured to the cylindrical cell components without the need to apply force to overcome friction.

In a preferred embodiment of the invention, a third annular section is secured to the second section, this third section having a central circular aperture of similar diameter to that of the aperture in the second section and serving to enhance a sealing engagement between the end cap and an inner cylindrical electrode passing through said apertures of the second and third sections. This third section is preferably secured to the second section by means of a screw thread, for the same reasons as discussed above in connection with the first and second sections.

One or both of the first and second sections of the end cap may be provided with lateral inlets through their outer walls, for the passage of electrolyte into or out of the cell compartments defined between the electrodes and the membrane. In the first section, the inlets can be provided axially between the seating for the first electrode and the circular aperture through which the membrane passes. In the second section the inlet can be provided axially between the first and second ends. In each case the lateral inlets are preferably arranged for tangential feed into the cell compartments so that a spiral flow pattern of the electrolyte through the anode or cathode chamber is achieved.

The electrolyte inlets are preferably equipped with John Guest fittings for sealing connections to electrolyte inlet or outlet pipes.

According to a further aspect of the invention, there is provided a cylindrical electrolysis cell comprising at least two tubular electrodes arranged coaxially, one within the other, with a cylindrical ion-permeable membrane arranged coaxially between them, wherein there is provided at least one end of the cell an insulating end cap as defined above, one end of a radially outer electrode of the cell being located in the circular seating at the first end of the first annular section, one end of the cylindrical membrane being located in the circular aperture at the second end of the first section and one end of an inner tubular electrode being located in the central aperture of the second section. This arrangement is preferably provided at both ends of the cell.

The cell membrane is preferably a ceramic ion-permeable membrane, more preferably comprising alumina and/or zirconia. One preferred type of membrane comprises $Al_2O_3$ particles with a mean particle size of 3 to 5 μm and $ZrO_2$ particles with a mean particle size of 0.3 to 0.8 μm. The preferred ratio of $Al_2O_3$ to 5 wt % of $Al_2O_3$ and 15 wt % $ZrO_2$. The end cap construction of the present invention means that relatively fragile membranes can be used. The membrane preferably has a thickness of 1-2 mm. The membrane can be made as a slip and fixed in cylindrical form.

Conventional electrolysis cells of the type to which the invention relates typically have an anode made of titanium, the cathode being of a different metal. In the preferred embodiments of the present invention, both the anode and the cathode can be made from titanium, and at least the anode is preferably coated with a mixed oxide for enhanced performance. In more preferred embodiments, both the anode and the cathode are made from titanium and coated with a mixed oxide. The preferred coating structures are made from platinum or platinum metal oxides, which may be mixed with other transition metal oxides. Preferred coatings will be discussed in more detail below.

Various different biocidal liquids can be produced in the electrolysis cells of the present invention, depending on the pipework configuration (flow pattern through the cell). For example, the electrolyte can be fed to the anode and cathode compartments and the electrolysed liquid can then be collected from each of these compartments separately. Alternatively, the electrolyte can be fed through both electrode chambers successively. Other factors which can be used to vary the biocidal liquid include the voltage applied to the electrodes, the electrical power absorbed, the electrode coating and physical size of the electrode, the shape of the electrodes and distances between them and the spacing and material of the membrane. The membrane material is also an important feature since it affects the mobility of ions passing between the electrodes.

The preferred mixed oxide coated electrodes comprise a titanium base activated with a coating structure which may comprise platinum, preferably in finely divided form such as platinum black, or platinum metal oxide mixed with oxides of one or more other transition metal oxides such as those of titanium, tantalum, niobilum, iridium, ruthenium, rhodium or palladium oxides, or mixtures thereof. The particular coating selected will depend on the application. By depositing a number of layers, one upon the other, a noble metal mixed oxide coating can be obtained on the titanium substrate. Each layer may be less than 1 μm thick. In a preferred process for reducing the coatings, the metal compounds are dissolved in organic solvents, applied to the surface and decomposed after drying. The titanium base is thus shielded and an electrode is obtained with a small internal resistance, high loading capacity for the electric current, a constant electrode potential over the life of the electrode and a low rate of wear.

When the electrode is to be used for the electrolysis of brine, for example sea water, for the production of biocidal liquids the preferred coating is a ruthenium mixed metal oxide or a platinum-iridium oxide coating on the titanium anode, depending on for example the temperature of the sea water and its salinity.

Where the electrolyte feed liquid comprises a brine feed of mains water mixed with sodium chloride for the production of biocidal liquids, a ruthenium mixed metal oxide coating is preferably applied to the titanium electrode. This is to ensure an optimal conversion of electrolyte into biocidal liquid. Deposits of electrolyte or brine in the biocidal liquid are minimised, and the content of active chlorine is maximised.

For sanitising water in order to make a sterile anti-oxidant drink, the preferred electrodes are coated with a platinum-iridium oxide coating or a ruthenium mixed metal oxide coating. This is to ensure the maximum production of oxygen within the electrolytic cell.

The biocidal liquids produced in the electrolytic cell can have a pH varying from 2 to 8.5 and an essentially positive redox potential, typically in the range from +600 to +1200 mV. Alternatively, a wetting alkaline liquid can be produced with a strongly negative redox potential, typically in the range from −800 mV to −1100 mV, depending on the conditions applied to the cell.

The negatively charged alkaline liquids are not stable and last only for about 48 hours before losing their charge. They have been used as a powerful anti-oxidant within the bodies of fish and mammals to boost the immune system. They have many other uses. The positively charged biocidal liquids can be sustained in what are stable solutions for up to two years given certain production conditions within the electrolytic cell. Although many large users of biocides may find it advantageous to manufacture fresh biocidal liquids, it can be shown that a sporicidal effect can be achieved with biocidal liquid blends for up to five months.

This invention sets out to produce an electrolytic cell with some unique features that address the problems of robustness, general reliability, cost, performance, ease of manufacture and quality control (traceability and usage of approved materials).

Some particular applications of the cells of the present invention will now be described.

Electrochemical Activation of Mineralised Water

The system used allows for two things to happen:

(1) It sterilises the water passing through the cell housing.

(2) It imposes an electrical charge on the water passing through the cell housing.

Sanitising water for drinking purposes is achieved using a diaphramatic electrolyses cell and an active-coal filter, in which water is purified in several stages:

First stage is the oxidation of water and its substances. Bacteria, viruses and organic substances are destroyed (oxidised). The water is saturated with short-lived oxidants, such as $HClO$, $ClO_2$, $O_3$, $O_2$, $H_2O_2$, $OH$.

The second stage takes place in a reaction chamber, where oxidation processes continue. The third stage consists of catalytic destruction of active chlorine compounds; removal of organic substances, taste and taint using activated coal as a sorbent.

The final stage consists of reduction of tap water and its substances. Toxic heavy metal ions and hazardous organic substances such as herbicides, pesticides, phenols and dioxins are transformed into non-toxic hydroxyls. The water is saturated with anti-oxidants: $OH^-$, $HO_2^-$ and $O_2$.

Electrolysis of water take place at the surface of mixed-oxide noble metal coated electrodes within the electrolytic cell. Free radicals are released during electrolysis like hydroxyls, oxidants, such as oxygen and ozone to sanitize the water passing through the anode and cathode chamber of an electrolytic cell. In order to "plate" out metals and break down organic molecules into harmless components an anthracite and activated carbon chamber are fitted next to the electrolytic cell. Part of this sanitizing process puts a predominantly negative charge on the water. This property makes the water an anti-oxidant. Anti-oxidants have many uses.

The two main properties listed give this technology a wide range of uses:

(1) Sterilisation and purification of water sources.

(2) Potable/hot water systems/water features;

(3) Additive in the food industry harnessing the anti-oxidant properties.

(4) As a fodder assimilator and health promoter in pigs and poultry.

(5) As a skin treatment for a range of dermatitis disorders.

(6) As a health drink for humans (anti-oxidant booster of the immune system).

To serve the needs outlined above where the quantity requirements are diverse a simple robust system for making the desired water is required. This invention seeks to use a standard cylindrical electrolysis cell which has been developed for water or brine electrolysis. Take advantage of the modular nature of the electrolytic cell and try to create an electrochemical activation process which can be tailored to address the many diverse applications.

Electrolysis of Brine

This electrochemical activation of a brine solution is achieved using a cylindrical diaphragm electrolysis cell (an electrolytic cell).

The electrolytic cell can produce various biocidal liquids, depending on the electrical power supply, the current drawn, brine feed and flow pattern convention.

In the cathode chamber, e.g. the following reactions take place:

$$2H_2O+2e^-=H_2+2OH^-$$

$$2H_3O+2e^-=H_3+2H_2O_2$$

In the anode chamber, e.g. the following reactions take place:

$$2Cl=Cl_2+2e^-$$

$$3H_2O=\tfrac{1}{2}O_2+2H_3O^-+2e^-$$

$$2OH=\tfrac{1}{2}O_2+H_2O+2e$$

and the formation of active chlorine:

$$Cl_2+H_2O+HClO$$

$$HClO+H^++ClO^-$$

As well as the formation of hypochlorite, as minor by-product:

$$HClO+NaOH=NaClO+H_2O$$

Several cylindrical cells exists where a water or brine solution to be processed flows upwards through valves in the lower part of the electrolysis cell. Electrochemically received anolyte and catholyte leave the electrolysis cell by separate channels in the upper part of the electrolysis cell. The disadvantage of these electrolysis cells is the possibility of gas-filled zones forming in the upper part of electrode chambers, so that considerable losses of electricity occur which are due to counter-flow of electrochemically obtained gases and electrolytes.

When the electrolytic cells of the invention are used for electrolysis of the potable water, water to be electrolysed is preferably supplied to both chambers in the lower part of an electrolytic cell, and the anolyte and catholyte received are removed separately from the upper parts of the separated chambers.

A spiral feed of electrolyte into the anode and cathode chambers leads to turbulization of the electrolytes in the chambers of the electrical cell, prolongs influence of electrolysis over elementary amounts of the processed water solutions, simplifies removal of gaseous and liquid products of electrolysis and reduces possible formation of gas-filled zones in the upper points of electrode chambers.

The space between outer cylindrical electrode and membrane, and between membrane and inner cylindrical electrode form separated electrode chambers whose geometric dimensions preferably satisfy the following:

$$D_D \geq 0.835 D_S$$

$$D_B \geq 0.695 D_S$$

$D_S$—inner diameter of outer cylindrical electrode, mm;

$D_D$—inner diameter of membrane, mm $D_B$—outer diameter of inner cylindrical electrode, mm In terms of surface area the relation between the anode and the cathode (ion exchange area) should preferably be roughly 1:1.40-1:1.50 respectively with a spacing between the electrodes (separated from the membrane) of 9 mm to 21 mm depending on the capacity of the electrolytic cell and the product requirements. The length of the ion exchange area can be varied depending on the volume required.

BRIEF DESCRIPTION OF THE DRAWINGS

Further objects and advantages of the invention will become apparent from the following detailed description, when read with reference to the accompanying drawings which illustrate preferred embodiments thereof.

In the Drawings:

FIG. 1 is a side elevation of an electrolytic cell having a pair of multiple end caps according to the present invention;

FIG. 2 is a cross-section on the line II-II of FIG. 1;

FIG. 2a is an enlarged detail of a part of FIG. 2;

DETAILED DESCRIPTION OF THE PREFERRED EMBODIMENTS

Figure 3:
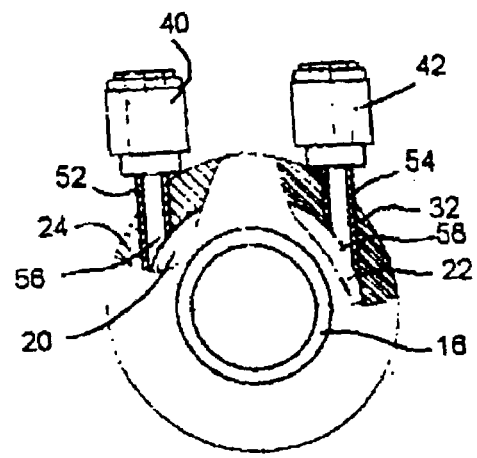
FIG. 3 is a partially cutaway bottom plan view of the cell of FIG. 1.

Referring first to FIGS. 1 and 2, a cylindrical electrolysis cell generally indicated by 10 comprises an outer cylindrical anode 12 enclosed on its outer surface by a cylindrical protective and insulating sleeve 14. This electrode is preferably made of titanium, coated on its inner surface with a transition metal oxide coating as described above. An inner cylindrical cathode 16, also preferably made of titanium and with a transition metal oxide coating on its outer surface, is arranged co-axially within the cylindrical anode, and a cylindrical ion-permeable membrane 18 is arranged co-axially between the electrodes in such a way as to define a space 20 between the anode and the membrane, which in use acts as an anolyte compartment, and a space 22 between the membrane and the cathode, which in use becomes the catholyte compartment.

The ion-permeable membrane 18 is preferably a ceramic membrane, and is suitably made from allumina.

An insulating end cap 23 is provided at each end of the cell, the end caps each comprising three annular sections which are co-axial with one another and secured together by means of screw threads. The three sections 24, 32 and 36 can best be seen in FIG. 2. The first annular section 24 has three circular apertures 26, 28 and 30. The aperture 26 is surrounded by an annular end face 27, against which bears one end of the insulating sleeve 14.

The aperture 26 has an inner diameter which matches the outer diameter of the cylindrical anode 12, and is separated from the aperture 28 by an annular shoulder 27, lying in a plane perpendicular to the longitudinal axis of the cell, and which acts as a seating for one end of the cylindrical anode 12.

The innermost circular aperture 30 of the first annular section has an inner diameter such as to match the outer diameter of the membrane 18, such that the membrane can be slid into this section without the need to overcome substantial friction but without significant play when it is in position.

A second annular section 32 of insulating material is detachably secured by a screw thread 33 to an end of the first section 24 which is remote from the seating 27 for the anode. This annular section has a circular recess within it, which is of larger diameter than the membrane 18, so that the second section can be screwed onto the first without touching the membrane, which may be projecting axially beyond the first section.

At its opposite axial end the second section of the end cap has a circular aperture 34 which accommodates one axial end of the cylindrical cathode 16.

The third annular section 36 is detachably secured to the second annular section 32 by means of a screw thread 39, and has a central circular aperture 38 of similar diameter to that of the second section. The third annular section serves to enhance a ceiling engagement between the end cap 23 and the cathode 16.

As can be seen in FIG. 2a, the central circular aperture 34 of the second annular section 32 has a circumferential channel 41 accommodating a ceiling ring 43 to enhance the seal between the second section and the cathode 16.

A radially projecting terminal 48 is provided for the anode 12, about half way along its axial length, and a similarly shaped terminal 50 is provided at one axial end of the cathode 16.

The two end cap assemblies at opposite ends of the cell are essentially the same, and each has a pair of John Guest fitting for ceiling connections of inlet and outlet pipes for electrolytes. Each of these fittings connects to a lateral inlet through one of the annular sections of the end caps, transverse to the longitudinal direction of the cell and offset from the central axis of the cell.

At the lower end of the cell, an inlet fitting 40 passes through the first annular section of the end cap to the space 20 which forms the anode chamber. At the upper end, a corresponding fitting 44 is provided as an outlet connection from the anode chamber.

A John Guest fitting 42 at the lower end of the cell provides an inlet connection through the second end cap section 32 to the anode chamber, and at the upper end of the cell a corresponding fitting 46 provides an outlet connection from the anode chamber.

The bottom plan view of FIG. 3 shows the electrolyte inlets in more detail. The John Guest fitting 40 connects to an inlet tube 52 which passes tangentially through the first section 24 of the lower end cap to communicate with the anode chamber 20 through an aperture 56.

Similarly, John Guest fitting 42 connects to an inlet pipe 54 through an aperture 58 in the second section 32 of the end cap, to feed electrolyte into the cathode chamber 22. A similar arrangement at the upper end of the cathode chamber 22 provides an outlet from the chamber through a John Guest fitting 46.

The inlet tubes 52 and 54 enter the respective anode and cathode chambers tangentially to impart a spiral motion to the electrolyte passing through each of the chambers. This enhances mixing of the electrolyte, with consequent benefit to the electrolysis process.

Figure 4:
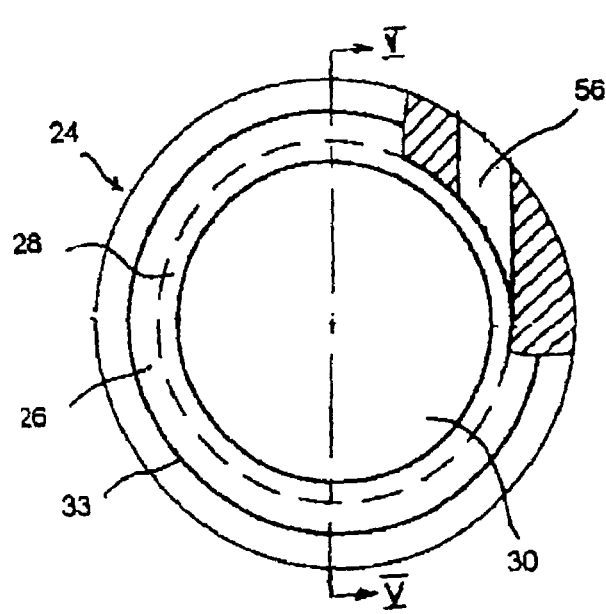
FIG. 4 is a partially cutaway plan view of a first section of one of the end caps of the cell of FIG. 1.
Figure 5:
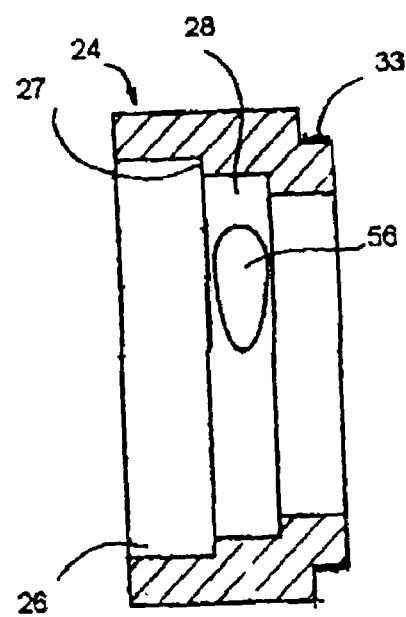
FIG. 5 is a cross-section on the line V-V of FIG. 4.

The structure of the first section 24 of the end cap is shown in more detail in FIGS. 4 and 5, which show the screw thread 33 at the second end of the section, the three co-axial apertures 26, 28 and 30 and the shape of the tangential inlet ball 56 where it enters the aperture 28. Also illustrated is the shoulder 27 which acts as a seating for the axial end of the anode.

Figure 6:
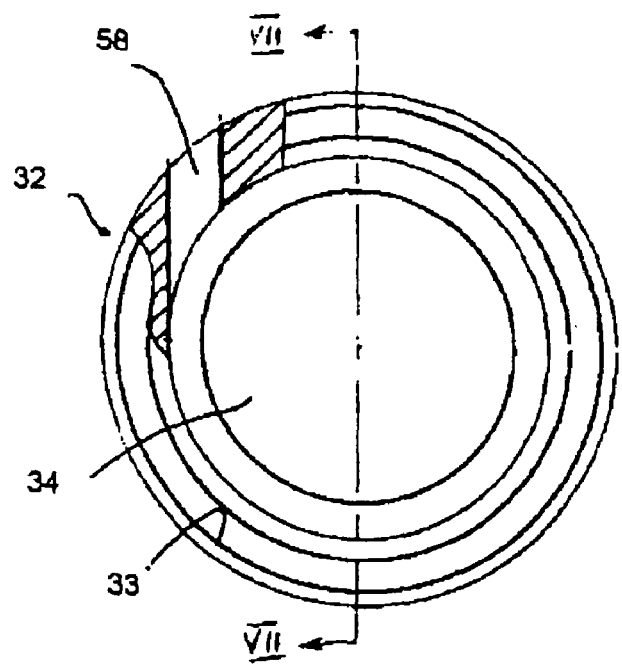
FIG. 6 is a partially cutaway plan view of the second section of a modification of one of the end caps of the cell of FIG. 1.
Figure 7:
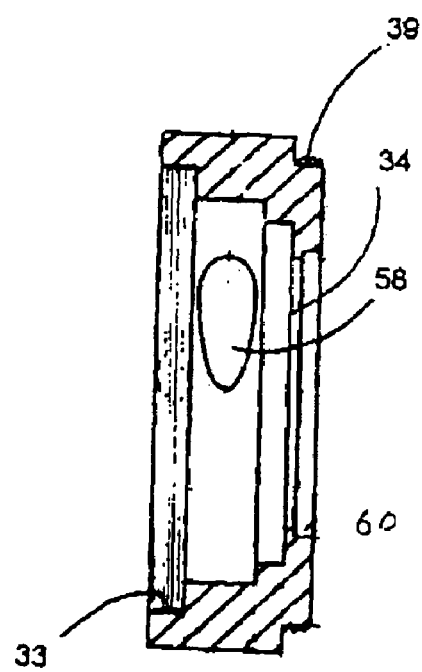
FIG. 7 is a cross-section on the line VII-VII of FIG. 6.

FIGS. 6 and 7 show a plan view of the second end cap section 32, from the side which connects to the first section. This shows the inside of the screw thread 33 and the inner aperture 34, as well as the tangential inlet 58 for the electrolyte. The cross-sectional view 7 also shows the screw thread 39 to which the third end cap section is attached.

In the version shown in FIG. 7, instead of an annular channel 41 to receive an O-ring, there is an open seating 60 so that an O-ring or other type of annular seal can be compressed by screwing on the third end cap section.

A two pack epoxy sealant is used to seal around the axial ends of the anode 12 where it seats in the end cap first section 24, around the outside of the axial ends of the membrane where they are received in the aperture 30 of the end cap first sections and around the axial ends of the cathode 16 where they are received in the apertures 34 of the second end cap sections.

The ceramic ion permeable membrane should preferably have a low hydraulic resistance and a high mechanical strength. The porosity and the pore size of the ceramic are important for electrolysis and depend on the nature of the particles in the slurry.

In one preferred process, ceramic ion permeable membranes can be manufactured by cast forming a slurry of a mixture of non-metallic and/or metallic particles in a porous mould. A slurry contains fine particles, but the majority are coarse particles. Most commonly used materials for the particles are alumina, mullite and zirconium-dioxide, but other materials can be used to give the membrane specific characteristics. After the slurry is applied to a porous mould, the slurry is fired at a temperature between 1100-1300° C. Firing is executed in a controlled environment in order to sinter the membrane without formation of cracks due to shrinkage and differences in the thermal expansion coefficient of the particles.

Figure 8:
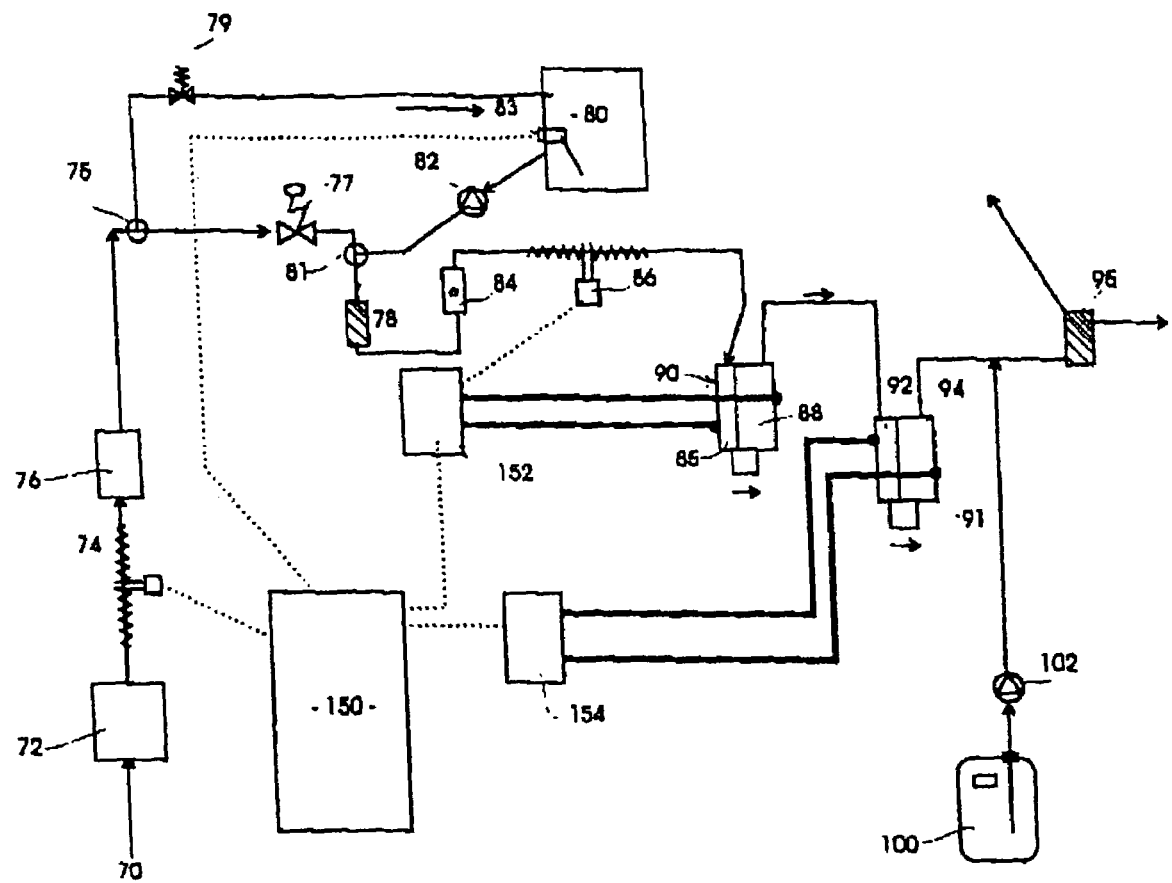
FIG. 8 is a schematic flow diagram of an electrolytic process using cells in accordance with the present invention.

FIG. 8 shows an example of an electrolyser system and a typical flow through such a system. The process of the present invention may be operated as illustrated by and with reference to FIG. 8 as follows:

A water supply 70, such as towns water, is fed via an optional pre-heater 72 which is typically controlled at from 30 to 40° C. through feed lines around which are wound aerials of a low band frequency radio wave transmitter 74. The water is optionally passed through a hard salt deioniser 76. The towns water supply feeds both the mixer column 78, and the brine tank 80. The towns water supply to the mixer column 78 is used to dilute the brine solution feed. The towns water supply to the brine tank is used to prepare the brine solution, typically from sodium chloride and towns water. The towns water feed line has a T-connector 75 to direct the towns water feed to the mixer column and to the brine tank. A first valve 77, in a first feed line after the T-connector in the towns water feed line controls the flow of towns water to the mixer column 78; a second valve 79, in a second feed line after the T-connector 75, in the towns water feed line controls the flow of towns water to the brine tank. Regulation of these valves controls the flow of towns water to the mixer column and to the brine tank. A second T-connector 81 is situated downstream of the valve 77 between the towns water supply and the mixer column. A feed line from the brine tank 80, via this second T-connector, provides a supply of brine, via a third valve 82 to the mixer column 78. Regulation of the first and third valves allows the concentration of brine fed to and exiting from the mixer column to be controlled. It will be appreciated that closing the third valve 82 will isolate the brine feed to the mixer column and result in only towns water being fed into the mixer column. It will also be appreciated that the first, second and third valves may be automated and controlled in response to a suitable signal from the electrolyser system. For example, the second valve 79 may be controlled by a level detector 83 in the brine tank, the valve closing when a particular pre-set level is reached. The first and third valves 79, 82 may be controlled by a suitable means such as a conductivity detector 84 situated before or after the mixer column which adjusts the relative flows of towns water to obtain a pre-set range of conductivity. Further the first and third valves may be controlled by a redox meter or pH meter measuring the redox or pH value of the liquid medium exiting the electrolyser(s) (E). In this example the feed liquid exiting the mixer column 78 is caused to flow into the anode chamber 85 of the first electrolyser 90 and from the anode chamber to the cathode chamber 88 of the first electrolyser. The liquid exiting the cathode chamber 88 of the first electrolyser is caused to flow into the anode chamber 92 of a second electrolyser 91 and from the anode chamber to the cathode chamber 94 of the second electrolyser. On its way from the mixer column to the first electrolyser the feed liquid is subjected to further radio waves from a generator 86.

The liquid medium exiting the electrolyser, or if more than one electrolyser the last electrolyser 91, is caused to flow into a gas entrainment column 95 where gases such as hydrogen, oxygen, ozone and chlorine which are produced in the process are disengaged. The gas entrainment column, is typically made of glass or plastics material which is packed with an inert support, such as plastics rings.

A non-foaming non-ionic surfactant held in a surfactant tank 100 may be fed into the liquid medium exiting the electrolyser 90 either before or after the gas entrainment column 95 (shown as before in FIG. 8). The surfactant may be fed into the liquid medium via a T-connector 102 and using a suitable pump, such as a peristaltic pump, to transfer the surfactant. The liquid medium exiting the gas entrainment column is ready for use as a broad spectrum biocide in sterilization, disinfection, and bio-film removal applications and the like.

A central power supply and control unit 150 controls the power supply to the electrolysers 90, 92 via transformers 152, 154, and also controls the operation of the valves and radio wave generators.

It will be appreciated that any number of electrolysers may be operated in series or in parallel as part of the electrolyser system. It will be further appreciated that the pipework connecting the electrolysers may be arranged in different ways to provide liquid media with different characteristics.

In a second example the liquid medium exiting the anode chamber is collected via an outlet from the anode chamber (not shown in FIG. 8).

In a third example part of the liquid medium exiting the anode chamber is collected and part is fed into the cathode chamber via a T-connector and outlet (not shown in FIG. 8). In a fourth example the feed liquid exiting the mixer column 78 is fed via a manifold device into electrolysers connected in parallel.

When the electrolyte is fed successively through the anode and cathode chamber of one or more cells in accordance with the invention, the resulting solution is known as "anolyte neutral (ANK) solution". This typically has a pH between 7 and 8.9, preferably 7.7+/−0.5. In this mode of operation, a rectified square wave direct current is applied across the electrodes. The electrical system applies a steady current based on the saline content of the brine flowing through the cell. This is set to certain working perimeters. The current is preferably at least 20 amps, depending on the volume and length of the cell, to ensure a good sporicidal liquid flow. Minimum brine concentrations ensure that the residues in the product are at a minimum. Brine feeds to the cell of 5 to 15 millisiemens (3 to 12 g/l) with a product concentration of 6 to 16 millisiemens (4 to 13 g/l). To preserve the life of the cell, the running temperature that is generated should be below 55° C. The electrical system is self monitoring in terms of working perimeters and also has a reverse polarity feature. This enables any surface contamination to be removed, and can be activated as desired, especially when running in a neutral product mode.

When running the system to produce purified water, a mineralised water feed with a TDS of about 300 microsiemens (0.3 g/l) is enough to draw sufficient current (at least 2.5 amps) to ensure that the product is germ free and negatively charged to −100 milli-volts on the redox meter. The voltage applied can be varied according to the mineralisation of the water, which should not be less than 250 microsiemens (0.25 g/l).

What is claimed is:

1. A method of making an electrolyzed liquid comprising:
providing an electrolysis cell comprising an outer tubular electrode separated from an inner tubular electrode by a tubular ion permeable membrane arranged coaxially one within the other and a pair of end caps where the space between the inner tubular electrode and the membrane and the space between the membrane and the outer tubular electrode defines anode and cathode compartments where one of the electrodes functions as an anode and the other electrode functions as a cathode;
providing a liquid comprising water or brine to the electrolysis cell and while in the electrolysis cell is contained within the anode and cathode compartments and the end caps; and
applying a current across the electrodes,
wherein each end cap provides a sealing engagement between the end cap and each of the inner tubular electrode, the outer tubular electrode, and the membrane, wherein the end cap has a lateral inlet through an outer wall thereof, said inlet being provided with a fitting for tangential feeding of the liquid to the inside of the end cap, and
wherein the end cap comprises:
a first annular section of insulating material with first and second axial ends, having at its first axial end a circular seating for one end of the outer cylindrical electrode and at its second end a circular aperture, of smaller diameter than the circular seating and coaxial therewith, to accommodate one end of the cylindrical membrane, and
a second annular section of insulating material detachably secured to the first annular section and having a central circular aperture, of smaller diameter than the central aperture of the first annular section and coaxial therewith to accommodate one end of the inner cylindrical electrode.

2. The method of claim 1, wherein the ion-permeable membrane is a ceramic membrane.

3. The method according to claim 1, wherein the ion-permeable membrane comprises alumina, zirconia, or a mixture thereof.

4. The method according to claim 1, wherein the ion-permeable membrane comprises a ceramic a transition metal oxide that is an oxide of a transition metal selected from the group comprising of titanium, niobium, tantalaum, iridium, ruthenium, rhodium, palladium and mixtures thereof.

5. The method according to claim 1, wherein the anode and cathode, or both, comprise a titanium base activated with a coating structure comprising platinum and at least one other transition metal oxide.

6. The method according to claim 5, wherein said at least one other transition metal oxide is an oxide of a transition metal selected from the group comprising of titanium, niobium, tantalaum, iridium, ruthenium, rhodium, palladium and mixtures thereof.

7. The method of claim 1, wherein the liquid is brine and the method further comprises, isolating a biocidal liquid, a sporicidal, or both, having a pH ranging from 2 and 8.5 and a positive redox potential ranging from 600 to 1200 mV.

8. The method of claim 1, wherein the liquid is brine and the method further comprises, isolating an alkaline biocidal liquid having a negative redox potential ranging from 600 to 1200 mV.

9. The method of claim 1, wherein a portion of the liquid exiting the cathode chamber is fed into the anode chamber.

10. The method of claim 1, wherein the liquid is fed successively through the cathode chamber and the anode chamber to produce an neutral anolyte (ANK) solution.

11. The method of claim 1, wherein the current is at least 20 amps.

12. The method of claim 1, wherein the current is at least 2.5 amps.

13. The method of claim 1, wherein the liquid is supplied to both the anode and cathode compartments at a lower part of the electrolysis cell and an anolyte and a catholyte are obtained from an upper part of the cell.

14. The method of claim 1, wherein a spiral feed of the liquid is fed to the anode and cathode compartments.

15. The method of claim 1, wherein the current is a rectified square wave direct current is applied across the electrodes.

16. The method of claim 1, wherein the first annular section comprises an inlet fitting connected to an inlet tube that passes tangentially through the first annular section of the end cap to communicate with the anode chamber through an aperture.

17. The method of claim 16, wherein the second annular section comprises an inlet fitting connected to an inlet pipe that passes through the second annular section of the end cap to communicate with the cathode chamber through an aperture.

18. The method of claim 1, wherein the second annular section comprises an inlet fitting connected to an inlet pipe that passes through the second annular section of the end cap to communicate with the cathode chamber through an aperture.

* * * * *

UNITED STATES PATENT AND TRADEMARK OFFICE
CERTIFICATE OF CORRECTION

PATENT NO. : 7,691,249 B2
APPLICATION NO. : 11/004252
DATED : April 6, 2010
INVENTOR(S) : James Daly and Michel van Schaik Page 1 of 1

It is certified that error appears in the above-identified patent and that said Letters Patent is hereby corrected as shown below:

Column 4,
Line 49, "Electrolysis of water take" should read --Electrolysis of water takes--.

Column 5,
Line 45, "Several cylindrical cells exists" should read --Several cylindrical cells exist--.

Column 6,
Line 63, "allumina" should read --alumina--.

Column 7,
Line 41, "John Guest fitting" should read --John Guest fittings--.

Column 9,
Line 20, "adjusts the relative flows" should read --adjusts the relative flow--.

Column 10,
Line 5, "neutral (ANK)" should read --neutral catholyte (ANK)--.

Signed and Sealed this

Twenty-ninth Day of June, 2010

David J. Kappos
*Director of the United States Patent and Trademark Office*